United States Patent
Chiang

(10) Patent No.: US 12,170,939 B2
(45) Date of Patent: Dec. 17, 2024

(54) IMS RESTORATION TIMER TRIGGERED BY USER ACTION DURING REGISTRATION

(71) Applicant: T-Mobile USA, Inc., Bellevue, WA (US)

(72) Inventor: Hsin Fu Henry Chiang, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 739 days.

(21) Appl. No.: 17/343,462

(22) Filed: Jun. 9, 2021

(65) Prior Publication Data

US 2022/0400360 A1 Dec. 15, 2022

(51) Int. Cl.
*H04L 65/1069* (2022.01)
*H04L 65/1073* (2022.01)
*H04W 4/50* (2018.01)
*H04W 76/10* (2018.01)
*H04W 80/10* (2009.01)

(52) U.S. Cl.
CPC ............ *H04W 4/50* (2018.02); *H04W 76/10* (2018.02); *H04W 80/10* (2013.01)

(58) Field of Classification Search
CPC ....... H04W 4/50; H04W 76/10; H04W 80/10; H04L 65/1069; H04L 65/1073; H04L 67/141; H04L 65/1016
See application file for complete search history.

(56) References Cited

U.S. PATENT DOCUMENTS

| | | |
|---|---|---|
| 10,051,017 B2 | 8/2018 | Chiang |
| 2011/0070887 A1* | 3/2011 | Wu .............. H04L 67/303 455/435.1 |
| 2015/0195864 A1* | 7/2015 | Bartolome ......... H04W 88/182 370/221 |
| 2018/0024892 A1 | 8/2018 | Noman |

FOREIGN PATENT DOCUMENTS

| | | |
|---|---|---|
| CN | 111107058 A | 5/2020 |
| EP | 4057584 A1 | 9/2022 |
| JP | 2016537836 B2 | 12/2016 |

OTHER PUBLICATIONS

Extended European Search Report mailed Oct. 12, 2022 for European Patent Application No. 22174915.3, 8 pages.

* cited by examiner

*Primary Examiner* — Joseph E Dean, Jr.
(74) *Attorney, Agent, or Firm* — Lee & Hayes, P.C.

(57) ABSTRACT

A timer may be used by a device during registration for one or more services of a telecommunication service provider. The function of the timer is to decrease the time that the device (and, hence, the user of the device) waits for successful registration in instances where the device becomes aware that the user clearly wants to use a service (e.g., make a call). The timer may be configured to start in response to the device receiving user input to establish a communication session during registration, and to stop in response to the device receiving a response indicating a successful registration. If the timer expires during registration, an IMS restoration procedure may be performed to attempt registration using a different approach, which, because of the relatively short duration of the timer, expedites the IMS restoration procedure to establish the session more quickly.

20 Claims, 5 Drawing Sheets

IMS RESTORATION TIMER TRIGGERED BY USER ACTION DURING REGISTRATION

BACKGROUND

Internet Protocol Multimedia Subsystem (IMS) is an architectural framework for delivering Internet Protocol (IP) multimedia to devices of users who subscribe to services of a telecommunication service provider. A user can utilize his/her device (or, user equipment (UE)) to communicate with other devices via the IMS core. However, before a UE can access services via the IMS core, the UE performs a registration procedure, called IMS registration. Moreover, the 3$^{rd}$ generation partnership project (3GPP) TS 24.299 and Request for Comments (RFC) 3261 define a timer called "Timer F" for use during IMS registration so that, if registration is taking longer than expected, the UE does not wait indefinitely for a response from the IMS core. Timer F is described as a "non-INVITE transaction timeout timer", and it is triggered when the UE initiates the registration procedure (e.g., when the UE sends a Session Initiation Protocol (SIP) request using the SIP REGISTER method). If registration does not succeed, Timer F will expire after a period of time (typically 128 seconds), and, after Timer F expires, the UE can then take steps to attempt registration using a different approach.

In a scenario where a user attempts to make a phone call while IMS registration is still pending, and where IMS registration is taking longer than expected, the user can be subjected to a long wait time before the call is eventually established. This is primarily due to the 128-second duration of Timer F. In some cases, a user may have to wait as long as 5 to 10 minutes before the user can make or receive a call. For example, if IMS registration is unsuccessful via a first proxy call session control function (P-CSCF) node, after waiting 128 seconds for Timer F to expire, the UE might attempt registration on a second P-CSCF node, and so on and so forth, potentially attempting registration via three or more P-CSCF nodes before attempting to register on a network of a roaming partner or a legacy radio network. Moreover, in order to give the network time to recover, the UE may be configured wait for progressively-longer time periods between successive registration attempts, thereby adding to the total wait time experienced by the user. The average user can only tolerate a certain amount of wait time to make a call, and users should not have to wait several minutes before a call can be made. Although shortening the duration of Timer F would appear to solve this problem, it is not a suitable solution because the 128-second duration of Timer F serves other valid purposes. For instance, the current implementation of Timer F may ensure that millions of UEs do not all leave the network at the same time when short delays are encountered early in the registration process. In view of the foregoing, users may experience prolonged wait times before being able to make a call, which leads to a poor user experience.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 1 shows a scenario where the timer is used to accelerate an IMS restoration procedure that involves the UE registering with another P-CSCF node of the current network to establish the communication session.

FIG. 2 shows a scenario where the timer is used to accelerate an IMS restoration procedure that involves the UE registering with another network to establish the communication session.

DETAILED DESCRIPTION

Figure 1:
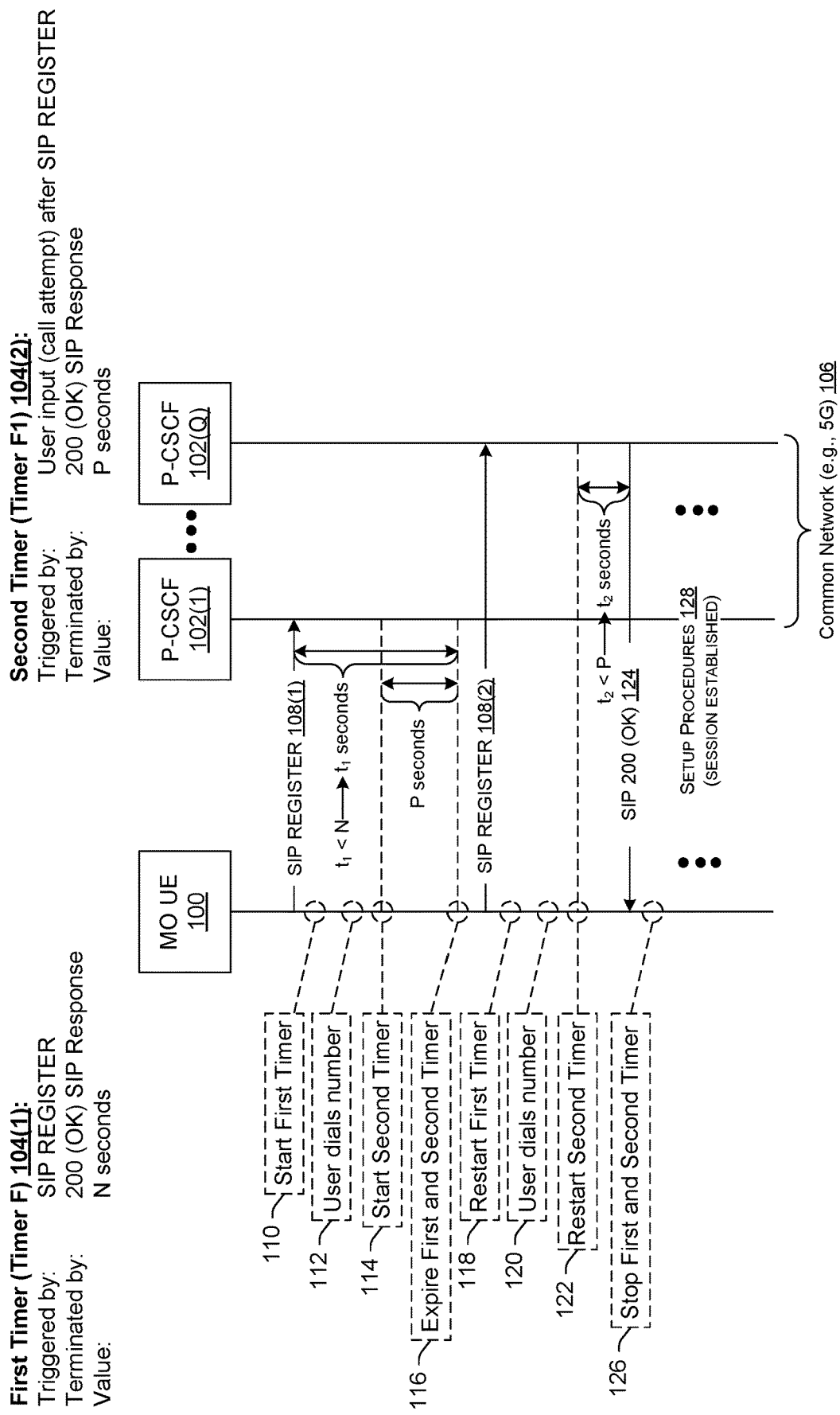
FIG. 1 is a diagram illustrating example signaling between a UE and example P-CSCF nodes, as well as the use of a timer that is triggered by user action during registration, according to various embodiments.

Described herein are techniques and systems for implementing one or more timers while a UE is registering for one or more services of a telecommunication service provider. In some embodiments, a timer (referred to herein as "Timer F1") may be used as a "guard timer" for Timer F (as defined in 3GPP TS 24.299 and RFC 3261) in instances where Timer F is used during registration for a UE. That is, the disclosed Timer F1 may "speed up" Timer F in instances where a user is attempting to establish a communication session (e.g., make a call) during registration. For example, Timer F1 may "speed up" Timer F by causing Timer F to expire prematurely, thereby accelerating IMS restoration so that a session (e.g., a call) can be established more quickly in instances where an initial problem in the network is causing registration to take longer than expected.

Timer F1 may be started and stopped by particular events, as described herein, which may occur during registration. For example, Timer F1 may be configured to start in response to a UE receiving user input to establish a communication session (e.g., when a user attempts to make a call) during registration. In other words, Timer F1 may be triggered if the UE receives user input to establish a communication session after the UE has sent a first registration request and prior to the UE receiving a response indicating a result of the first registration request. Furthermore, Timer F1 may be configured to stop in response to the UE receiving a response indicating a successful registration (e.g., when IMS registration successfully completes), such as by the UE receiving a 200 (OK) SIP response prior to the expiration of the Timer F1. The duration of Timer F1 can be shorter than the duration of Timer F. In this manner, Timer F1 may act as a guard timer that expedites the expiration of Timer F in a particular scenario. For example, Timer F1 may be configured to expire after a period of time within a range of about 5 seconds to 10 seconds, which is shorter than the typical 128-second duration of Timer F.

If Timer F1 expires during registration, an IMS restoration procedure may be performed to attempt registration using a different approach in hopes of establishing the communication session for the UE. Because Timer F1 is of a shorter duration than Timer F, this IMS restoration procedure is expedited based on the user's attempt to establish the communication session (e.g., the user making a call attempt). In an illustrative example, the IMS restoration procedure performed at the expiry of Timer F1 may involve traversing through a list of available P-CSCF nodes in an attempt to register via one of those P-CSCF nodes, and, if registration is successful via a P-CSCF node on the list, the UE may establish the communication session via that P-CSCF node. Additionally, or alternatively, if Timer F1 expires while attempting to register via a current P-CSCF node of a first network, the IMS restoration procedure may involve attempting registration via a second, different network than the first network, such as a network of a roaming partner, a legacy radio network operated by the telecommunication service provider, or the like.

An example process to be implemented by a device, such as a UE, can include sending, to a first node of a first network, a first request to register for one or more services of a telecommunication service provider, receiving user input to establish a communication session prior to receiving a response indicating a result of the first request to register for the one or more services, and starting a timer (e.g., Timer F1) in response to receiving the user input. The timer is configured to expire after a period of time and to stop in response to the device receiving a response indicating a successful registration prior to expiration of the timer. After starting the timer, if the device receives a response indicating a successful registration prior to expiration of the timer, the device stops the timer and establishes the communication session via the first node of the first network. If, however, the timer expires prior to the device receiving such a response, the device may initiate an IMS restoration procedure by, for example, sending a second request to register for the one or more services to at least one of: (i) a second node of the first network, or (ii) a node of a second network.

Also disclosed herein are systems and devices comprising one or more processors and one or more memories, as well as non-transitory computer-readable media storing computer-executable instructions that, when executed, by one or more processors perform various acts and/or processes disclosed herein.

The use of Timer F1 during registration decreases the time that the UE (and, hence, the user) waits for successful registration in instances where the UE becomes aware that the user clearly wants to use a service (e.g., make a call). That is, when a user attempts to establish a communication session (e.g., make a call) during registration, instead of waiting the full 128-second time period for Timer F to expire, the UE truncates the time period of Timer F, and, if registration is still unsuccessful at the expiry of that truncated time period, IMS restoration can be initiated, thereby expediting the establishment of the session (e.g., call) on behalf of the subscriber. Although session establishment may be somewhat delayed by waiting for Timer F1 to expire, the use of Timer F1 improves the user experience overall by shortening the wait time to establish the communication session, thereby providing a more stable telecommunications network. In some embodiments, the techniques, devices, and systems described herein may allow one or more devices to conserve resources with respect to processing resources, memory resources, networking resources, power resources, etc., in the various ways described herein. For example, by selectively expediting IMS restoration for select users who are eager to establish a communication session (e.g., make a call), networking resources are conserved for those select users.

FIG. 1 is a diagram illustrating example signaling between an originating UE 100 (designated as "MO UE" 100 in FIG. 1, "MO" meaning "mobile originated" or "mobile originating") and a plurality of P-CSCF nodes 102(1) . . . 102(Q) (collectively 102), as well as the use of a timer 104(2) that is triggered by user action (e.g., user input provided to the UE 100) during registration, as described in detail herein. FIG. 1 illustrates the use of multiple timers 104, including a first timer 104(1) and the aforementioned second timer 104(2). It is to be appreciated that additional timers can be utilized in addition to those illustrated in FIG. 1. It is also to be appreciated that, in some examples, the second timer 104(2) may be used independently of (i.e., without also using) the first timer 104(1). FIG. 1 shows a scenario where at least the second timer 104(2) is used to accelerate (or expedite) an IMS restoration procedure when a user of the UE 100 is attempting to make a call. The example IMS restoration procedure shown in FIG. 1 involves the UE 100 registering with another P-CSCF node 102(Q) of the current network 106 to establish the communication session.

It is to be appreciated that the "nodes" depicted in FIG. 1 may in fact represent multiple nodes or a single node. It is also to be appreciated that additional nodes may be utilized in registering the UE 100 for one or more services of a telecommunication service provider and for establishing a communication session, even though they are not depicted in FIG. 1, as would be recognized by a person having ordinary skill in the art.

In accordance with various embodiments described herein, the terms "user equipment (UE)," "wireless communication device," "wireless device," "communication device," "mobile device," "client device," "computing device," "electronic device," "user device," and "device" may be used interchangeably herein to describe any UE (e.g., the originating UE 100) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE)—e.g., fourth Generation (4G), voice over New Radio (VoNR)—e.g., fifth Generation (5G), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology. The originating UE 100 may be implemented as any suitable type of computing device configured to communicate over a wireless network, including, without limitation, a mobile phone (e.g., a smart phone/handset), a tablet computer, a laptop computer, a portable digital assistant (PDA), a wearable computer (e.g., electronic/smart glasses, a smart watch, fitness trackers, head-mounted display (HMD), etc.), an in-vehicle (e.g., in-car) computer, and/or any similar mobile device, as well as situated computing devices including, without limitation, a television (smart television), set-top-box (STB), desktop computer, and the like.

In general, a user can utilize the UE 100 to communicate with other computing devices of a telecommunications network via an IMS core. The IMS core is sometimes referred to herein as "IMS core network," "IMS network," "Core Network (CN)," or "IM CN Subsystem". The IMS core can be maintained and/or operated by one or more service providers, such as one or more telecommunication service providers (or "wireless carriers," "operators," etc.), that provide IMS-based services to users (sometimes called "subscribers") who are associated with UEs, such as the originating UE 100. For example, a service provider may offer multimedia telephony services that allow a subscribed user to call or message other users via an IMS core using his/her UE. A user can also utilize an associated UE to receive, provide, or otherwise interact with various different IMS-based services by accessing computing devices of an IMS core. In this manner, an operator of an IMS core may offer any type of IMS-based service, such as, telephony services, emergency services (e.g., E911), gaming services, instant messaging services, presence services, video conferencing services, social networking and sharing services, location-based services, push-to-talk services, real-time text (RTT) services, and so on. The P-CSCF nodes 102(1)-(Q) may be part of the IMS core associated with a common network 106 (e.g., a 5G NR network). In order to access IMS-based services, a UE is configured to request establishment of a communication session. In the case of telephony services, the communication session can comprise a call (i.e., a voice-based communication session, such as a VoNR (5G) call).

The originating UE 100 is configured to utilize various access networks, including radio access networks (RANs) and/or radio access technologies (RATs), in order to access the IMS core. UEs that are 5G NR-compliant may be configured to communicate with heterogeneous cellular networks by employing radios that can communicate over 5G systems (or "5G networks") as well as over legacy or predecessor systems (or "legacy networks") relative to 5G systems. Similarly, UEs that are 4G LTE-compliant may be configured to communicate within heterogeneous cellular networks by employing radios that can communicate over LTE systems (or "LTE networks") as well as over legacy or predecessor systems (or "legacy networks") relative to 4G systems. Today's legacy networks, such as third generation (3G), and second generation (2G) networks, may employ circuit-switching for voice communications, while 5G and 4G LTE networks employ packet-switching for both data and voice communications in an all-IP data transport technology. In general, 4G LTE-compliant and 5G NR-compliant UEs are configured to prefer attachment to corresponding networks, which offer relatively high data-rate throughput as compared to available legacy or predecessor networks. In most UEs, a choice of which protocol to employ depends primarily on what networks are available to the UE at the UE's present geographic location. Furthermore, in instances where the preferred network (e.g., 4G, 5G, etc.) is unavailable or unusable for any reason, legacy networks, if available, may be used as a fallback protocol, such as by using a circuit-switch fallback (CSFB) mechanism. The originating LE 100 of FIG. 1 can comprise a LE with such capabilities to allow for communication over any type of telecommunications network.

FIG. 1 illustrates that the originating UE 100 may perform an attach procedure, which may include, among other sub-procedures, requesting registration for one or more services of a telecommunication provider (e.g., one or more IMS-based services provided via the IMS core). Registration of the originating UE 100 can involve identifying a P-CSCF node 102(1) of the IMS core, and sending a registration request (or request to register for one or more services) via a RAN to an address of the P-CSCF node 102(1).

As used herein, a "request" is a message that is sent from a UE, such as the originating UE 100, to a network node (e.g., a node of the IMS core, such as a P-CSCF node 102). Meanwhile, a "response" is a message that is sent from a network node to a UE, such as the originating UE 100. This construct may be used when discussing communications that use any particular signaling protocol. For example, SIP may be used by the originating UE 100 for transmitting messages to/from the IMS core. Accordingly, a "SIP request" is a message that is sent from a UE, such as the originating UE 100, to the IMS core using SIP protocol, and a "SIP response" is a message that is sent from the IMS core to a UE, such as the originating UE 100, using SIP protocol. SIP is a signaling protocol that can be used to establish, modify, and terminate multimedia sessions (e.g., a multimedia telephony call, an emergency call, etc.) over packet networks, and to authenticate access to IMS-based services. Accordingly, the originating UE 100 may send a first SIP request 108(1) using the SIP REGISTER method as part of the initial procedures for registration, which is to be completed before the UE 100 can establish a communication session to access one or more IMS-based services. The IMS core allows for peer-to-peer communications, as well as client-to-server communications over an IP-based network. Accordingly, the IMS core can represent any type of SIP-based network that is configured to handle/process SIP signaling packets or messages.

As shown in FIG. 1, the SIP request 108(1) may be sent from the originating UE 100 to the IMS core, and in particular, to the P-CSCF node 102(1). The SIP request 108(1) represents a registration request, and, with respect to the P-CSCF node 102(1), it is the initial (or first) SIP request 108(1) that starts a first SIP dialogue between the UE 100 and the P-CSCF node 102(1). It is to be appreciated that the registration procedures can include various actions and message transmissions by and between the originating UE 100 and various network nodes in addition to the SIP request 108(1) depicted in FIG. 1, and that additional registration procedures may be performed during registration, depending on the implementation. In general, any suitable registration procedures known to a person having ordinary still in the art can be implemented, which are performed with the aim of registering the originating UE 100 for one or more services of a telecommunication service provider. Because network topologies vary between service providing entities, the signaling employed may vary.

FIG. 1 further illustrates that the originating UE 100 is configured to implement a first timer 104(1) and a second timer 104(2) (collectively 104). The first timer 104(1) may represent "Timer F", as defined in 3GPP TS 24.299 and RFC 3261. Timer F is described by the 3GPP standard as a "non-INVITE transaction timeout timer." The second timer 104(2) is referred to herein as "Timer F1" because it may be used as a "guard timer" for the first timer 104(1) (Timer F) in instances where the first timer 104(1) (Timer F) is used during registration for a UE 100, as depicted in FIG. 1. That is, the second timer 104(2) (e.g., Timer F1) may "speed up" (or accelerate, expedite, etc.) the first timer 104(1) (Timer F) in instances where a user is attempting to establish a communication session (e.g., make a call) during registration. The second timer 104(2) (Timer F1) may "speed up"

the first timer 104(1) (Timer F) by causing the first timer 104(1) (Timer F) to expire prematurely, thereby accelerating IMS restoration so that a session (e.g., a call) can be established more quickly in instances where an initial problem in the network is causing registration to take longer than expected. Each timer 104 has particular properties/characteristics. Again, although two timers 104(1) and 104(2) are described, it is to be appreciated that the originating UE 100 may implement additional timers 104, each with defined properties/characteristics including, without limitation, a trigger event that starts the timer 104, a termination event that stops the timer 104, a timer value that defines a period of time after which the timer 104 expires, and/or a "fire" action that is taken/performed upon expiration of the timer 104. These timer properties/characteristics will be described in more detail below with respect to each timer 104(1) and 104(2).

The first timer 104(1) (Timer F) is, per 3GPP standard, configured to start whenever the originating UE 100 sends a registration request. This registration request can be a request to register for one or more services of a telecommunication service provider, a request to register for one or more IMS-based services via the IMS core of the network 106, or the like. In the example of FIG. 1, this registration request is in the form of a SIP request 108 using the SIP REGISTER method. Accordingly, the first timer 104(1) (Timer F) is configured to start in response to the UE 100 sending the first SIP request 108(1) using the SIP REGISTER method. The first timer 104(1) (Timer F) is also configured to restart in response to the originating UE 100 sending each subsequent SIP request 108 using the SIP REGISTER method. Accordingly, when the originating UE 100 sends the first SIP request 108(1) using the SIP REGISTER method, the first timer 104(1) (Timer F) is started at 110. This event (i.e., the sending of the SIP request 108(1) using the SIP REGISTER method) is an example of what is often referred to herein as a "trigger event." This is because the occurrence of the particular event causes the first timer 104(1) (Timer F) to start (or causes triggering of the first timer 104(1) (Timer F)). Said another way, the first timer 104(1) (Timer F) is started if a particular criterion is satisfied. In the example of FIG. 1, the criterion for triggering the first timer 104(1) (Timer F) is satisfied when the originating UE 100 sends a SIP request 108 using the SIP REGISTER method, such as the SIP request 108(1), the SIP request 108(2), and any subsequent SIP requests using the SIP REGISTER method.

The second timer 104(2) (Timer F1) is configured to start in response to the originating UE 100 receiving, at a particular time, user input to establish a communication session (sometimes referred to herein as a "call event" or a "call attempt"). That is, the user input is a trigger event for the second timer 104(2) (Timer F1) if that user input is received (or detected) by the UE 100 at a time between (i) sending a request to register for one or more services of a telecommunication service provider (e.g., sending a SIP request 108 using the SIP REGISTER method), and (ii) receiving a response indicating a result of the request to register for the one or more services, such as a 200 (OK) SIP response indicating a successful registration. Said another way, the second timer 104(2) (Timer F1) may be triggered to start if a call event/attempt occurs while the first timer 104(1) (Timer F) is active or "running". Furthermore, the second timer 104(2) (Timer F1) is configured to restart in response to the originating UE 100 receiving subsequent user input to establish a communication session, so long as the user input is received within the above-noted time window for each subsequent registration request. In some examples, the UE 100 is configured to check a state machine of the UE's IMS stack to determine the state of registration. In the example of FIG. 1, at a time at which the user dials the number at 112, the state machine may indicate that the state of registration associated with the UE 100 is in a pending state (or "still pending", "still unsuccessful", etc.). Accordingly, FIG. 1 shows that the user dials a number at 112, and the second timer 104(2) (Timer F1) starts at 114 in response to the user dialing the number at 112 while registration is still pending. Here, the user dialing a number at 112 is an example type of user input to establish a communication session, and it is to be appreciated that a user of the originating UE 100 can attempt to initiate a communication session in any suitable fashion. For calls in particular, the UE 100 may receive user input at 112 indicating that the user selected an existing contact (e.g., a stored phone number), dialed a phone number on a keypad (e.g., a soft keypad presented on a touch screen, or a physical keypad of the UE 100 having depressible buttons, etc.), spoke an utterance (e.g., "Call Mom") that is detected by a microphone of the originating UE 100 and understood by voice recognition software, and so on. Any of these types of user input received at 112 act as a trigger event to start the second timer 104(2) (Timer F1). Furthermore, the starting of the second timer 104(2) (Timer F1) at 114 may be based on the receipt or detection of the user input at 112. Additionally, or alternatively, the modem of the UE 100 may be used to determine that a call attempt has been made at 112. Furthermore, the call may be buffered (or queued) in response to the UE 100 receiving the user input to establish a communication session at 112.

A timer value defines a period of time (e.g., N seconds for the first timer 104(1) (Timer F) and P seconds for the second timer 104(2) (Timer F1), where N>P) after which the timer 104 will expire, as measured from the time of starting the timer 104, which occurs in response to the relevant trigger event for the timer 104. The timer value may be specified in any suitable unit of time (e.g., seconds, milliseconds, minutes, etc.). In some embodiments, the timer value of N seconds for the first timer 104(1) (Timer F) is set to a value of 128 seconds (or 64*T1, where T1 is defined in 3GPP TS 24.229 as being set to a value of 2 seconds by default). In some embodiments, the timer value of P seconds for the second timer 104(2) (Timer F1) may be within a range of about 5 seconds to 10 seconds. Therefore, the timer value, P, for the second timer 104(2) (Timer F1) may be less than the timer value, N, for the first timer 104(1) (Timer F), meaning that the second timer 104(2) (Timer F1) will expire before the first timer 104(1) (Timer F) as long as more than P seconds remain on the first timer 104(1) (Timer F) when the second timer 104(2) (Timer F1) is triggered. In some embodiments, the timer value of P seconds for the second timer 104(2) (Timer F1) is set to a value of 5 seconds.

Both timers 104(1) and 104(2) may be stopped (or terminated) in response to the originating UE 100 receiving any REGISTER response, such as a response indicating a successful registration prior to expiration of the timer 104. Such a response may be in the form of a 200 (OK) SIP response, as shown in FIG. 1. This event (i.e., the receipt of a 200 (OK) SIP response) is an example of what is often referred to herein as a "termination event." This is because the occurrence of the event causes the timer 104 to stop (or terminate). The assumption here is that the termination event occurs before the timer 104 has expired (i.e., before N seconds has lapsed since starting the first timer 104(1) (Timer F), and before P seconds has lapsed since starting the second timer 104(2) (Timer F1). Said another way, the timers 104 are stopped if a particular criterion is satisfied. In this case, the criterion for stopping the timers 104 is satisfied when the originating UE 100 receives a 200 (OK) SIP response before the timers 104 expire. It is to be appreciated that the timers 104(1) and 104(2) may be stopped when a call is terminated due to other causes, such as a radio link failure, losing battery power, and the like.

FIG. 1 depicts a scenario where the second timer 104(2) (Timer F1) expires during registration (a timer "expiring" is sometimes referred to as the timer "firing"). In the scenario of FIG. 1, the first timer 104(1) (Timer F) has started at 110 in response to the occurrence of its trigger event (e.g., the UE 100 sending the SIP request 108(1)) and the second timer 104(2) (Timer F1) has started at 114 in response to the occurrence of its trigger event (e.g., the user dialing a number at 112), but the termination event for stopping both timers 104 does not occur within P seconds from starting the second timer 104(2) (Timer F1), and, therefore, the second timer 104(2) (Timer F1) expires at 116. Expiration of a timer 104 can be referred to herein as a "timeout," or the timer 104 "firing." When a timer 104 "times out," "expires," or "fires," it means that the period of time defined by the timer value (e.g., P seconds for the second timer 104(2) (Timer F1)) has lapsed since starting the timer 104, and without the designated termination event occurring before timeout. In other words, if a timer 104 "times out," "expires," or "fires," it means that the timer 104 was not stopped by the designated termination event within the designated period of time defined by the timer value. In the example of FIG. 1, the second timer 104(2) (Timer F1) expires at 116 because a 200 (OK) SIP response was not received by the UE 100 within P seconds from the UE 100 starting the second timer 104(2) (Timer F1) in response to receiving the user input (e.g., the user dialing the number) at 112. Additionally, or alternatively, the second timer 104(2) (Timer F1) may expire at 116 based on the state machine of the UE's IMS stack indicating that the state of registration associated with the UE 100 is still in a pending state (or "still pending", "still unsuccessful", etc.) after P seconds has lapsed since starting the second timer 104(2) (Timer F1) at 114.

FIG. 1 illustrates that the first timer 104(1) (Timer F) also expires at 116, albeit prematurely. That is, in the example of FIG. 1, the second timer 104(2) (Timer F1) expires at $t_1$ seconds since the first timer 104(1) (Timer F) was started at 110, where $t_1$ is less than N seconds, N being the value of the first timer 104(1) (Timer F) that defines the expiration period. Accordingly, in the example of FIG. 1, in response to determining that the second timer 104(2) (Timer F1) has expired at 116, the UE 100 may cause a premature (or early) expiration of the first timer 104(1) (Timer F). Thus, the second timer 104(2) (Timer F1) accelerates (or expedites) the IMS restoration procedure following the expiration of the first timer 104(1) (Timer F) because the UE 100 does not wait for the full N seconds of the first timer 104(1) (Timer F) to lapse before initiating IMS restoration.

In response to the second timer 104(2) (Timer F1) firing/expiring/timing out at 116 (and in response to the first timer 104(1) (Timer F) prematurely firing/expiring/timing out at 116), the originating UE 100 may perform a designated "fire" action. In some embodiments, the fire action includes the originating UE 100 reattempting to register for the one or more services of the telecommunication service provider using a different P-CSCF node 102, such as the P-CSCF node 102(Q) in FIG. 1. For example, in response to determining that the second timer 104(2) (Timer F1) has expired at 116, the UE 100 may send a second registration request (e.g., a second SIP request 108(2) using the SIP REGISTER method) to the second, different P-CSCF node 102(Q). The UE 100 may also release the call (i.e., the call attempted by the user at 112) after a period of time (e.g., after 2 seconds) based on the expiration of the second timer 104(2). In some embodiments, the originating UE 100 is configured to retry registration as many times as the number of P-CSCF nodes 102 (e.g., "Q" representing the number of P-CSCF nodes 102) of the IMS core that are available to the UE 100. This means that the UE 100 may learn of the available P-CSCF nodes 102(1)-(Q) in advance of the second timer 104(2) (Timer F1) expiring at 116. For example, at a time before sending the first SIP request 108(1), the UE 100 may have previously registered with another P-CSCF node 102 of the network 106, and that P-CSCF node 102 may have provided the UE 100 with a packet data network (PDN) connection response that included a list of the P-CSCF nodes 102(1)-(Q) and their corresponding addresses, in order of priority. This is sometimes called a "PCO list" because the UE 100 may initiate a context activation procedure which carries a PCO field with a request for one or more P-CSCF address (es). The P-CSCF addresses representing the P-CSCF nodes 102(1)-(Q) are returned to the UE 100 in this regard. A P-CSCF address may be in the form of an IP address or a fully qualified domain name (FQDN). Although multiple P-CSCF nodes 102(1)-(Q) are depicted in FIG. 1, it is to be appreciated that the number, Q, of P-CSCF nodes 102 provided to the UE 100 can be a single P-CSCF node 102 or multiple P-CSCF nodes 102; in the example of FIG. 1, Q≥2. Furthermore, the P-CSCF nodes 102(1)-(Q) shown in FIG. 1 are part of a common network 106, such as a 5G NR network.

In response to sending the second SIP request 108(2) using the SIP REGISTER method to the second P-CSCF node 102(Q), the originating UE 100 may restart the first timer 104(1) (Timer F) at 118. This is because the sending of the second SIP request 108(2) using the SIP REGISTER method is a trigger event for the first timer 104(1) (Timer F). Thus, the time period of N seconds starts again from the restarting of the first timer 104(1) (Timer F) at 118 until a termination event or the expiration of the first timer 104(1), whichever occurs first.

Furthermore, in the example of FIG. 1, the user dials a number again at 120, which causes the UE 100 to restart the second timer 104(2) (Timer F1) at 122. This is because receiving user input to establish a communication session (e.g., a call)—if received after sending the second registration request (e.g., the second SIP request 108(2) using the SIP REGISTER method) and prior to receiving a response indicating a result of the second registration request—is a trigger event for the second timer 104(2) (Timer F1). Thus, the time period of P seconds starts again from the restarting of the second timer 104(2) (Timer F1) at 122 until a termination event or the expiration of the second timer 104(2), whichever occurs first. Notably, in the example of FIG. 1, the second timer 104(2) (Timer F1) would not have restarted had the user not dialed the number again at 120. This means that the user action determines how aggressive the UE 100 behaves in expediting the establishment of the communication session. Said another way, if the user iteratively attempts to make a call, the call will get established quicker, at least in instances where the UE 100 is unsuccessful in registering via a P-CSCF node 102(1). This allows for differentiating between users who are desperate or eager to make a call, and users who are not so desperate or eager to make a call, and it prioritizes those who are more eager to make a call over those who aren't. Again, the call may be buffered (or queued) in response to the UE 100 receiving the user input to establish a communication session at 120.

In the example of FIG. 1, the originating UE 100 receives a 200 (OK) SIP response 124 from the second P-CSCF node 102(Q), which is received $t_2$ seconds since the second timer 104(2) (Timer F1) was restarted at 122, where $t_2$ is less than P seconds, P being the value of the second timer 104(2) (Timer F1) that defines the expiration period. In the scenario of FIG. 1, both timers 104(1) and 104(2) are stopped at 126 in response to receiving the 200 (OK) SIP response 124 prior to expiration of the timers 104(1) and 104(2) (after restarting the timers 104(1) and 104(2)). The 200 (OK) SIP response 124 that is received from the second P-CSCF node 102(Q) is an indication from the second P-CSCF node 102(2) of a successful registration. Additionally, or alternatively, the both timers 104(1) and 104(2) may be stopped at 126 based on the state machine of the UE's IMS stack indicating that the state of registration associated with the UE 100 is successful within P seconds since restarting the second timer 104(2) (Timer F1) at 122.

After stopping the timers 104(1) and 104(2) at 126, the originating UE 100 may perform one or more setup procedures 128 to establish the communication session (e.g., a call, such as a VoNR call), as requested by the user at 120. Example setup procedures that may be included in the setup procedures 128 can include, without limitation, the originating UE 100 sending/receiving any SIP request/response to/from the IMS core, such as sending a SIP request using the SIP INVITE method, receiving a 100 Trying response, receiving a 180 Ringing response (indicating that a called party of the terminating UE is being alerted), receiving a 181 Call Being Forwarded response, receiving a 182 Queued response, receiving a 183 Session In Progress response, receiving a SIP response that includes session description protocol (SDP) information (e.g., an SDP answer), receiving a SIP response that includes "early media" (e.g., user data), and/or receiving a final response to resolve the setup of the communication session. Such a final SIP response can be in the form of a 2xx—successful (e.g., a 200 (OK) response indicating successful connection), 3xx—redirection, 4xx—client failure, 5xx—server failure, or 6xx—global failure, and so on. Further examples of the setup procedures 128 include, without limitation, the originating UE 100 sending/receiving any Non-Access Stratum (NAS)-based request/response to/from an mobility management entity (MME), such as sending/receiving a radio resource control (RRC) connection request/response to/from the MME, sending/receiving a RRC connection reconfiguration complete request/response to/from the MME, sending/receiving a request/response to/from the MME indicating that a dedicated bearer has been established, and so on. Further examples of the setup procedures 128 can include, without limitation, the originating UE 100 sending/receiving any type of UPDATE request/response, sending/receiving any type of "ACK" request/response (e.g., a PRACK message), and so on, to/from any suitable network node.

Registration procedures and setup procedures for a given communication session may vary by implementation, session type (e.g., phone call verses video conference, emergency verses non-emergency call, etc.), attachment result (e.g., combined attached verses not combined attached), network topology, and/or other factors. Accordingly, detailed and exhaustive examples of procedures and the order in which they are performed in order to register for IMS-based services and to setup a communication session are not described herein, as the various possible setup procedures are generally known to a person having ordinary skill in the art. As such, any given registration and/or session setup may include some or all of the example procedures described herein, performed in a suitable order. It is to be appreciated that a communication session is not successfully established unless and until the originating UE 100 receives a final SIP response in the form of a 2xx response.

The example timers 104(1) and 104(2) described with reference to FIG. 1 work together such that the second timer 104(2) (Timer F1) acts as a guard timer for the first timer 104(1) (Timer F), thereby causing the originating UE 100 to refrain from waiting the remainder of the N seconds that are left on the first timer 104(1) (Timer F) in instances where the second timer 104(2) (Timer F1) expires, thereby accelerating the IMS restoration procedure, as compared to an implementation without the second timer 104(2) (Timer F1). In other words, when the UE 100 receives, during registration, an indication that the user wants to make a call, the UE 100 attempts to register for IMS-based services via another P-CSCF node 102(Q) in a more aggressive manner (i.e., without waiting for the full N seconds of the first timer 104(1) (Timer F) to lapse) than it would have if the user had not wanted to make a call.

Figure 2:
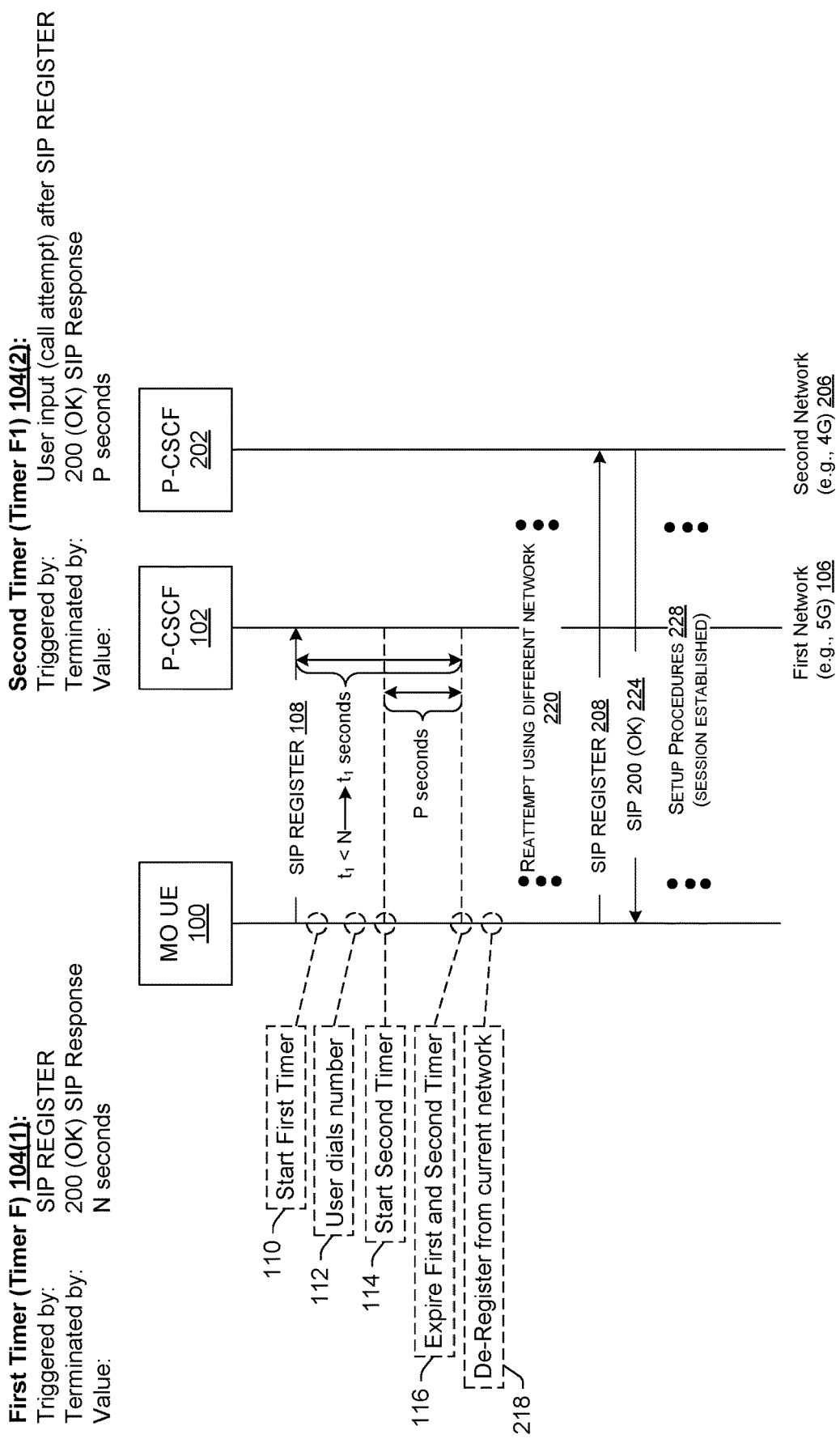
FIG. 2 is a diagram illustrating example signaling between a UE and example P-CSCF nodes, as well as the use of the timer of FIG. 1.

In an illustrative example, a user of the UE 100 (e.g., a phone) might attempt to make a phone call while the UE 100 is still trying to register on a 5G network 106. If IMS registration is taking longer than expected, the second timer 104(2) (Timer F1) starts in response to the user attempting to make the phone call (which may be detected by the UE 100 receiving user input to establish the phone call. If IMS registration is still pending when the second timer 104(2) (Timer F1) expires (e.g., after P seconds), the UE 100 may initiate an IMS restoration procedure, which, in FIG. 1, involves attempting to establish the call via another P-CSCF node 102(Q) in a list of known P-CSCF nodes 102(1)-(Q). This is just one example of an IMS restoration procedure. In some examples, after exhausting attempts to register on all of the P-CSCF nodes 102(1)-(Q) in the list, the UE 100 may attempt to register on another network different than the network 106. This approach is illustrated in FIG. 2, and it may be used in conjunctions with FIG. 1, or as an alternative approach to that of FIG. 1. Ultimately, the wireless carrier may determine the IMS restoration procedure that is to be taken in response to the expiration of the second timer 104(2) (Timer F1). The approaches illustrated in FIGS. 1 and 2 are merely exemplary.

FIG. 2 is a diagram illustrating example signaling between the UE 100 of FIG. 1 and a plurality of P-CSCF nodes 102 and 202, as well as the use of the timers 104 introduced in FIG. 1. In FIG. 2, the UE 100 is shown as implementing an IMS restoration procedure that involves the UE 100 registering with another network 206 to establish the communication session as a result of the second timer 104(2) (Timer F1) expiring during a registration attempt on the first network 106. As mentioned, this example IMS restoration procedure depicted in FIG. 2 can be used in conjunction with the approach illustrated in FIG. 1. For example, the UE 100 may be configured to initially traverse through a list of P-CSCF nodes 102(1)-(Q) that are part of a common network 106 (i.e., the approach illustrated in FIG. 1), and, if the UE 100 is unable to register using a P-CSCF node 102 of the first network 106 (e.g., a 5G NR network), the UE 100 may then reattempt registration on a second network 206, such as a 4G LTE network, a different legacy network (e.g., 3G/2G), and/or a network of a roaming partner. Alternatively, the approach outlined in FIG. 2 can be used independently of the approach in FIG. 1. For example, the UE 100 may be configured to attempt registration on a single P-CSCF node 102 of the first network 106, and, if registration is unsuccessful on that P-CSCF node 102, the UE 100 may attempt registration via the second P-CSCF node 202 of the second network 206 without attempting registration on additional P-CSCF nodes 102 of the first network 106.

It is to be appreciated that the "nodes" depicted in FIG. 2 may in fact represent multiple nodes or a single node. It is also to be appreciated that additional nodes may be utilized in registering the UE 100 for one or more services of a telecommunication service provider, even though they are not depicted in FIG. 2, as would be recognized by a person having ordinary skill in the art.

In the example of FIG. 2, the UE 100 may attempt to register for one or more services of a telecommunication service provider by sending, to a first P-CSCF node 102 of a first network 106, a first registration request (e.g., a first SIP request 108 using the SIP REGISTER method. The first network 106 may be 5G NR network, for example. The steps 110, 112, 114, and 116 following the transmission of the first SIP request 108 may be the same as described with reference to FIG. 1, and they will not be described again with respect to FIG. 2 for the sake of brevity. In FIG. 2, in response to the second timer 104(2) (Timer F1) firing/expiring/timing out at 116 (and in response to the first timer 104(1) (Timer F) prematurely firing/expiring/timing out at 116), the originating UE 100 may optionally de-register from the current (first) network 106 at 218 (e.g., 5GMM-DEREGISTERED), and the UE 100 may, at 220, reattempt registration using a second, different network 206, such as a 4G LTE network. For example, the UE 100 may send a second request to register for the one or more services (e.g., a second SIP request 208 using the SIP REGISTER method) to a second P-CSCF node 202 of the second network 206, and, if successful, the UE 100 receives a 200 (OK) SIP response 224, and performs setup procedures 228 to establish a communication session via the second network 206. These setup procedures 228 may be similar to the setup procedures 128 described with reference to FIG. 1. The IMS restoration approach illustrated in FIG. 2 may be referred to as an "IMS voice-not-available" procedure, and it may involve starting Timer T3502 (e.g., a 12 minute timer) in response to the UE 100 de-registering from the first network 106 at 218. In some examples, the UE 100 may implement a blind reattempt to fall back to the second network 206 (e.g., a 4G LTE network), which may not involve any de-registration signaling to de-register from the first network 106, and the UE 100 may search for the second network 206 with little-to-no network assistance. In any case, using the approach of FIG. 2, if the UE 100 is unable to register on the first network 106, the UE 100 may look for help outside of the first network 106, such as by looking for the second network 206. Either of the approaches illustrated in FIG. 1 or 2, or both approaches in combination, may allow for establishing a communication session (e.g., a call) on behalf of the user more quickly, as compared to an implantation without the second timer 104(2) (Timer F1).

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
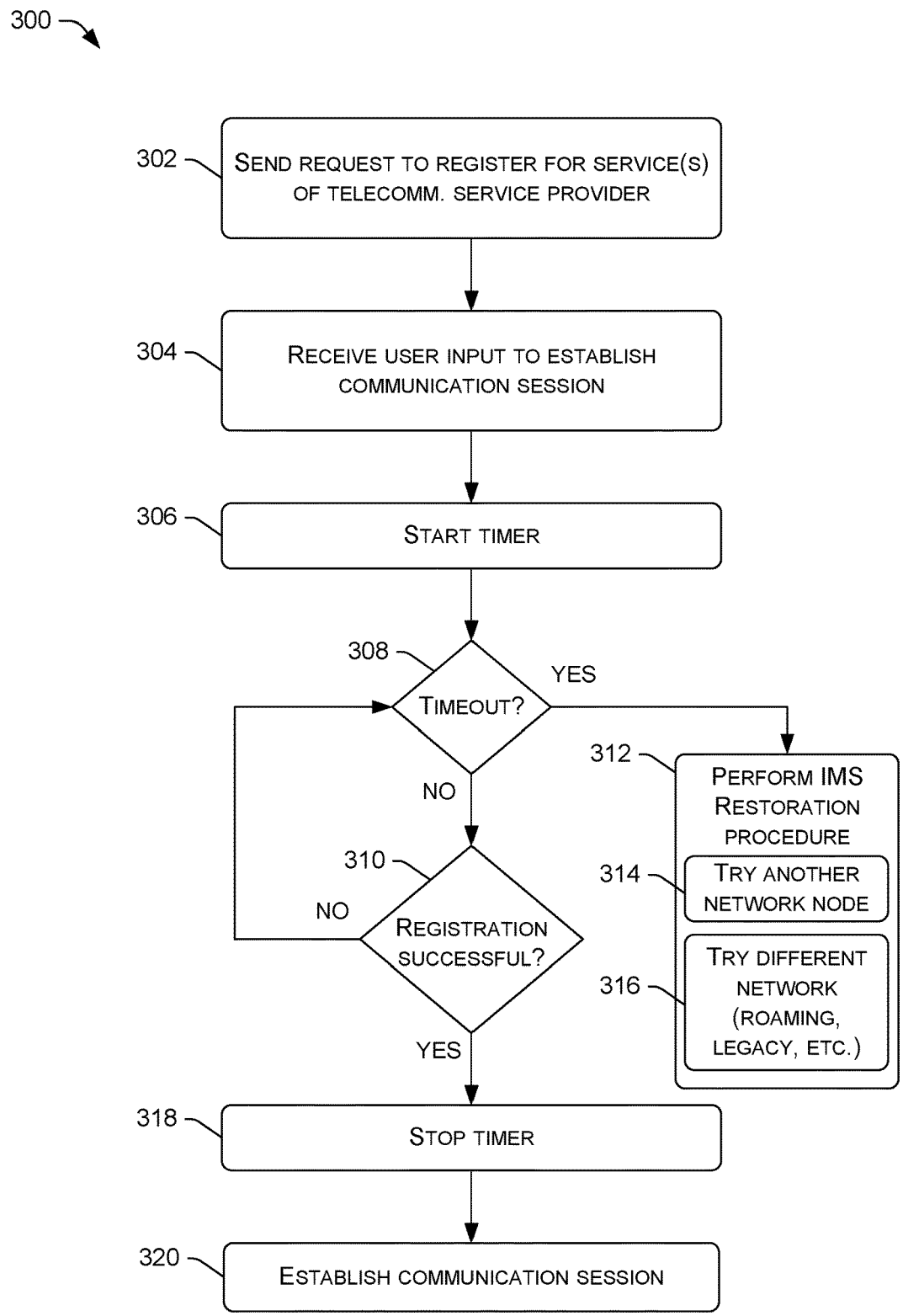
FIG. 3 illustrates a flowchart of an example process for utilizing a timer to accelerate an IMS restoration procedure when a user is attempting to establish a communication session during registration, according to various embodiments.

FIG. 3 illustrates a flowchart of an example process 300 for utilizing a timer 104(2) (Timer F1) to accelerate an IMS restoration procedure when a user is attempting to establish a communication session during registration, according to various embodiments. The process 300 is described with reference to the previous figures.

At 302, a device (e.g., the UE 100) may send, to a first node of a first network, a first request to register for one or more services of a telecommunication service provider. The first request may be a first SIP request 108(1) using a SIP REGISTER method. The first node that receives the first request may be a first P-CSCF node, such as the P-CSCF node 102(1) of FIG. 1, or the P-CSCF node 102 of FIG. 2. The first network can be any suitable network, such as a 5G NR network.

At 304, the device (e.g., the UE 100) may receive user input to establish a communication session prior to receiving a response indicating a result of the first request to register for the one or more services. For example, at a time at which the user input is received at block 304, a state machine may indicate that a state of registration associated with the device is in a pending state, meaning that the device has sent a SIP request 108(1) using the SIP REGISTER method, but the device has not yet received a final SIP response in the form of a 2xx—successful (e.g., a 200 (OK) response), 3xx—redirection, 4xx—client failure, 5xx—server failure, or 6xx—global failure, and so on. The user input received at block 304 may be any suitable form of user input, such as touch input (e.g., selecting an existing contact or dialing a phone number via a touch screen, physical keys, etc.), voice input, gestural input, etc.

At 306, the device (e.g., the UE 100) may start a timer 104(2) (Timer F1) in response to receiving the user input at block 304. The timer 104(2) (Timer F1) may be configured to expire after a period of time (e.g., P seconds) and to stop in response to the device receiving a response indicating a successful registration (e.g., a 200 (OK) SIP Response) prior to expiration of the timer 104(2) (Timer F1). In some examples, the starting of the timer 104(2) (Timer F1) is based at least in part on a state of registration associated with the device being in a pending state at a time at which the user input is received at block 304. Additionally, or alternatively, the modem of the device may be used to determine that an attempt to establish a communication session has been made at block 304.

At 308, the device (e.g., the UE 100) may determine whether the timer 104(2) (Timer F1) has expired. If the timer 104(2) (Timer F1) has not yet expired at block 308, the process 300 may follow the NO route from block 308 to block 310.

At 310, the device (e.g., the UE 100) may determine whether a response indicating a successful registration (e.g., a 200 (OK) SIP Response) has been received and/or the device may check the state machine for the state of registration. If a "successful registration" response has not been received at block 310 and/or if the state machine indicates that the state of registration is still pending, the process 300 may follow the NO route from block 310 back to block 308 to continue monitoring the timer 104(2) (Timer F1) for the occurrence of a timeout or a termination event, whichever occurs first. If the timeout occurs first at block 308 (i.e., if the device determines, at block 308, that the timer 104(2) (Timer F1) has expired without the device having received the response indicating the successful registration and/or while the state of registration is still pending), the process 300 may follow the YES route from block 308 to block 312.

At 312, the device (e.g., the UE 100) may perform an IMS restoration procedure. The IMS restoration procedure performed at block 312 may be carrier-specific. In some examples, the IMS restoration procedure performed at block 312 involves trying another network node at block 314. For example, in response to determining that the timer 104(2) (Timer F1) has expired, the device may send a second request to register for the one or more services to a second node of the first network. The second request may be a second SIP request 108(2) using the SIP REGISTER method. The second node that receives the second request 108(2) may be a second P-CSCF node 102(Q), where the second node is in a common network 106 as the first node that received the first request sent at block 302. In some examples, the IMS restoration procedure performed at block 312 involves trying a different network at 316. For example, in response to determining that the timer 104(2) (Timer F1) has expired, the device may send a second request to register for the one or more services to a node of the second network, such as a 4G LTE network, and/or a network of a roaming partner. Here, the second request may be a second SIP request 208 using the SIP REGISTER method, but the node that receives the second request 208 may be a second P-CSCF node 202 that is in a different network 206 than the first network 106 associated with the first node that received the first request sent at block 302. In some examples, sub-blocks 314 and 316 may be performed sequentially at block 312. In other words, the device may first try another network node of the current (first) network 106, and may subsequently try a different network 206 if unsuccessful on the first network 106.

Returning to block 310, if the device receives a response indicating a successful registration (e.g., a 200 (OK) SIP Response) prior to expiration of the timer 104(2) (Timer F1) and/or if the state machine indicates that the state of registration is successful prior to expiration of the timer 104(2) (Timer F1), the process 300 may follow the YES route from block 310 to block 318.

At 318, the device (e.g., the UE 100) may stop the timer 104(2) (Timer F1) in response to receiving the response indicating the successful registration at block 310, which may cause the state machine to indicate that the state of registration is successful. At 320, the device (e.g., the UE 100) may establish the communication session via the first node of the first network that received the first registration request sent at block 302. Accordingly, the process 300 illustrates a technique for using a timer 104(2) (Timer F1) to expedite IMS restoration in instances where user input to establish a communication session is received while registration is still pending.

Figure 4:
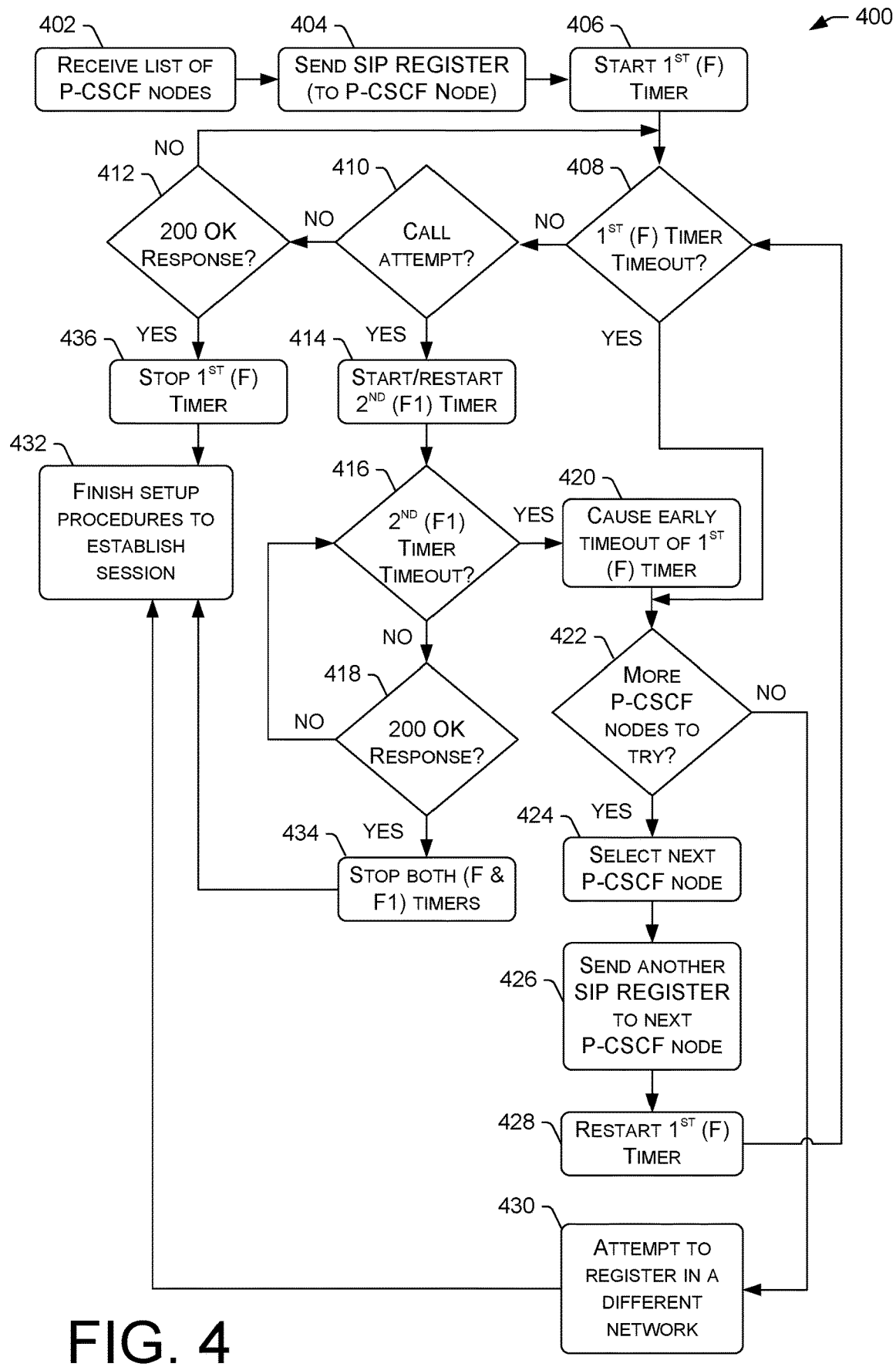
FIG. 4 illustrates a flowchart of an example process for utilizing multiple timers, one of the timers acting as a guard timer for the other in order to accelerate an IMS restoration procedure when a user is attempting to establish a communication session during registration, according to various embodiments.

FIG. 4 illustrates a flowchart of an example process 400 for utilizing multiple timers 104, one of the timers 104(2) (Timer F1) acting as a guard timer for the other in order to accelerate an IMS restoration procedure when a user is attempting to establish a communication session during registration, according to various embodiments.

At 402, a device (e.g., the UE 100) may receive a list of P-CSCF nodes 102(1)-(Q), the list including at least a first P-CSCF node 102(1) and the second P-CSCF node 102(Q). For example, the device, as part of a registration procedure, receive a PDN connection response that includes a list (e.g., a PCO list) of the P-CSCF nodes 102(1)-(Q) and their corresponding addresses, in order of priority. The P-CSCF addresses representing the P-CSCF nodes 102(1)-(Q) may be in the form of an IP address or a FQDN. The P-CSCF nodes 102(1)-(Q) in the list may be associated with a first network 106, such as a 5G NR network.

At 404, the device (e.g., the UE 100) may send, to the first P-CSCF node 102(1), a first SIP request 108(1) using a SIP REGISTER method. This first request 108(1) is an example of a first request to register for one or more services of a telecommunication service provider.

At 406, the device (e.g., the UE 100) may start a first timer 104(1) (Timer F) in response to sending the first request 108(1) at block 404. The first timer 104(1) (Timer F) may be configured to expire after a first period of time (e.g., N seconds) and to stop in response to the device receiving a response indicating a successful registration (e.g., a 200 (OK) SIP Response) prior to expiration of the first timer 104(1) (Timer F).

At 408, the device (e.g., the UE 100) may determine whether the first timer 104(1) (Timer F) has expired. If the timer 104(1) (Timer F) has not yet expired at block 408, the process 400 may follow the NO route from block 408 to block 410.

At 410, the device (e.g., the UE 100) may determine whether a call attempt has been made by a user of the device. For example, the device may determine whether user input to establish a communication session has been received, such as touch input (e.g., selecting an existing contact or dialing a phone number via a touch screen, physical keys, etc.), voice input, gestural input, etc. If a call attempt has not been made at block 410, the process 400 may follow the NO route from block 410 to block 412.

At 412, the device (e.g., the UE 100) may determine whether a response indicating a successful registration (e.g., a 200 (OK) SIP Response) has been received and/or the device may check the state machine of the device's IMS stack for the state of registration. If no "successful registration" response has been received at block 412 and/or if the state of registration is still pending, the process 400 may follow the NO route from block 412 back to block 408 to iterate the determination of whether the first timer 104(1) (Timer F) has expired. At 410, if the device determines that a call attempt has been made by the user (e.g., by receiving or detecting user input to establish a communication session), the process 400 may follow the YES route from block 410 to block 414.

At 414, the device (e.g., the UE 100) may start a second timer 104(2) (Timer F1) in response to the user making the call attempt (e.g., the device receiving or detecting the user input) at block 410. The second timer 104(2) (Timer F1) may be configured to expire after a period of time (e.g., P seconds) that is shorter than the period of time (e.g., N seconds) associated with the first timer 104(1) (Timer F). In other words, the first period of time (e.g., N seconds) of the first timer 104(1) (Timer F) may be longer than the second period of time (e.g., P seconds) of the second timer 104(2) (Timer F1). The second timer 104(2) (Timer F1) may be configured to stop in response to the device receiving a response indicating a successful registration (e.g., a 200 (OK) SIP Response) prior to expiration of the second timer 104(2) (Timer F1). In some examples, the starting of the second timer 104(2) (Timer F1) is based at least in part on a state of registration associated with the device being in a pending state at a time at which the user input is received at block 410.

At 416, the device (e.g., the UE 100) may determine whether the second timer 104(2) (Timer F1) has expired. If the second timer 104(2) (Timer F1) has not yet expired at block 416, the process 400 may follow the NO route from block 416 to block 418.

At 418, the device (e.g., the UE 100) may determine whether a response indicating a successful registration (e.g., a 200 (OK) SIP Response) has been received and/or the device may check the state machine of the device's IMS stack to determine the state of registration. If no "successful registration" response has been received at block 418 and/or if the state of registration is still pending, the process 400 may follow the NO route from block 418 back to block 416 to continue monitoring the second timer 104(2) (Timer F1) for the occurrence of a timeout or a termination event, whichever occurs first. If the timeout occurs first at block 416 (i.e., if the device determines, at block 416, that the second timer 104(2) (Timer F1) has expired without the device having received the response indicating the successful registration and/or while registration is still pending), the process 400 may follow the YES route from block 416 to block 420.

At 420, the device (e.g., the UE 100) may cause an early (or premature) expiration of the first timer 104(1) (Timer F) in response to determining that the second timer 104(2) (Timer F1) has expired without the device having received the response indicating the successful registration and/or while registration is still pending. As a result, both timers 104(1) and 104(2) are expired at block 420.

At 422, the device (e.g., the UE 100) may determine whether there are more P-CSCF nodes 102 in the list to try. That is, the device may determine whether the it has attempted to register for the one or more services with all of the P-CSCF nodes 102(1)-(Q) in the list received at block 402. If the device determines, at block 422, that it has not attempted to register for the one or more services with all of the P-CSCF nodes 102 in the list, the process 400 may follow the YES route from block 422 to block 424, where the device may select the next P-CSCF node 102 in the list of P-CSCF nodes 102(1)-(Q).

At 426, the device (e.g., the UE 100) may send, to the selected (second) P-CSCF node 102(Q), a second SIP request 108(2) using the SIP REGISTER method. This second request 108(2) is an example of a second request to register for the one or more services of the telecommunication service provider.

At 428, the device (e.g., the UE 100) may restart the first timer 104(1) (Timer F) in response to sending the second request 108(2) at block 426. The process 400 may return to block 408 following the restarting of the first timer 104(1) (Timer F) at block 428. After sending the second request 108(2) to the second P-CSCF node 102(Q), if the first timer 104(1) (Timer F) has not yet expired at block 408, the device may determine, at block 410, whether another call attempt has been made by a user of the device. For example, the device may determine whether second user input to establish a communication session has been received prior to receiving a response indicating a result of the second request to register for the one or more services. At 410, if the device determines that another call attempt has been made by the user (e.g., by receiving or detecting user input to establish a communication session), the process 400 may follow the YES route from block 410 to block 414 where the device may restart the second timer 104(2) (Timer F1) in response to receiving the second user input corresponding to the additional call attempt. An example reason for restarting the second timer 104(2) (Timer F1) after a second call attempt is made is to differentiate between users who are desperate or eager to make a call and users who are not desperate or eager to make a call, and to more aggressively expedite IMS restoration using the second timer 104(2) (Timer F1) for those users who are very desperate or eager to make the call. This conserves networking resources for those desperate/eager users.

If the second timer 104(2) (Timer F1) keeps expiring after restarting the second timer 104(2) (Timer F1), the device may iterate blocks 416-428 as long as there are more P-CSCF nodes 102 in the list to try. If, at 422, the device determines that it has attempted to register for the one or more services with all of the P-CSCF nodes 102 in the list, the process 400 may follow the NO route from block 422 to block 430.

At 430, the device (e.g., the UE 100) may attempt to register in a different network 206. For example, in response to determining that the second timer 104(2) (Timer F1) has expired and that there are no more P-CSCF nodes 102 in the first network 106 to try, the device may send another request to register for the one or more services to a node of a second, different network 206, such as a 4G LTE network, and/or a network of a roaming partner. Here, the request to register with a node of the second network 206 may be a SIP request 208 using the SIP REGISTER method, and the node that receives the request 208 may be a P-CSCF node 202 that is in the second, different network 206. Assuming this registration attempt is successful, the device (e.g., the LIE 100) may finish setup procedures to establish a communication session on behalf of the UE 100 and the user thereof, as described herein.

Returning to block 418, if the device receives a response indicating a successful registration (e.g., a 200 (OK) SIP Response) prior to expiration of the second timer 104(2) (Timer F1) and/or if the state machine of the device's IMS stack indicates that the state of registration is successful, the process 400 may follow the YES route from block 418 to block 434, where the device (e.g., the UE 100) may stop both timers 104(1) and 104(2) in response to receiving the response indicating the successful registration at block 418. At 432, the device (e.g., the UE 100) may establish the communication session via the current P-CSCF node 102 of the first network 106 that provided the 200 (OK) SIP Response to the device at block 418.

Returning to block 412, if the device receives a response indicating a successful registration (e.g., a 200 (OK) SIP Response) and/or if the state machine of the device's IMS stack indicates that the state of registration is successful prior to expiration of the first timer 104(1) (Timer F) without having started the second timer 104(2) (Timer F1), the process 400 may follow the YES route from block 412 to block 436, where the device (e.g., the UE 100) may stop the first timer 104(1) (Timer F) in response to receiving the response indicating the successful registration at block 412. At 432, the device (e.g., the UE 100) may establish the communication session via the current P-CSCF node 102 of the first network 106 that provided the 200 (OK) SIP Response to the device at block 412. Accordingly, the process 400 illustrates a technique for using multiple timers 104 (e.g., the first timer 104(1) (Timer F) and the second timer 104(2) (Timer F1)), where the second timer 104(2) (Timer F1) is used as a guard timer for the first timer 104(1) (Timer F) to expedite IMS restoration in instances where user input to establish a communication session is received while registration is still pending.

Figure 5:
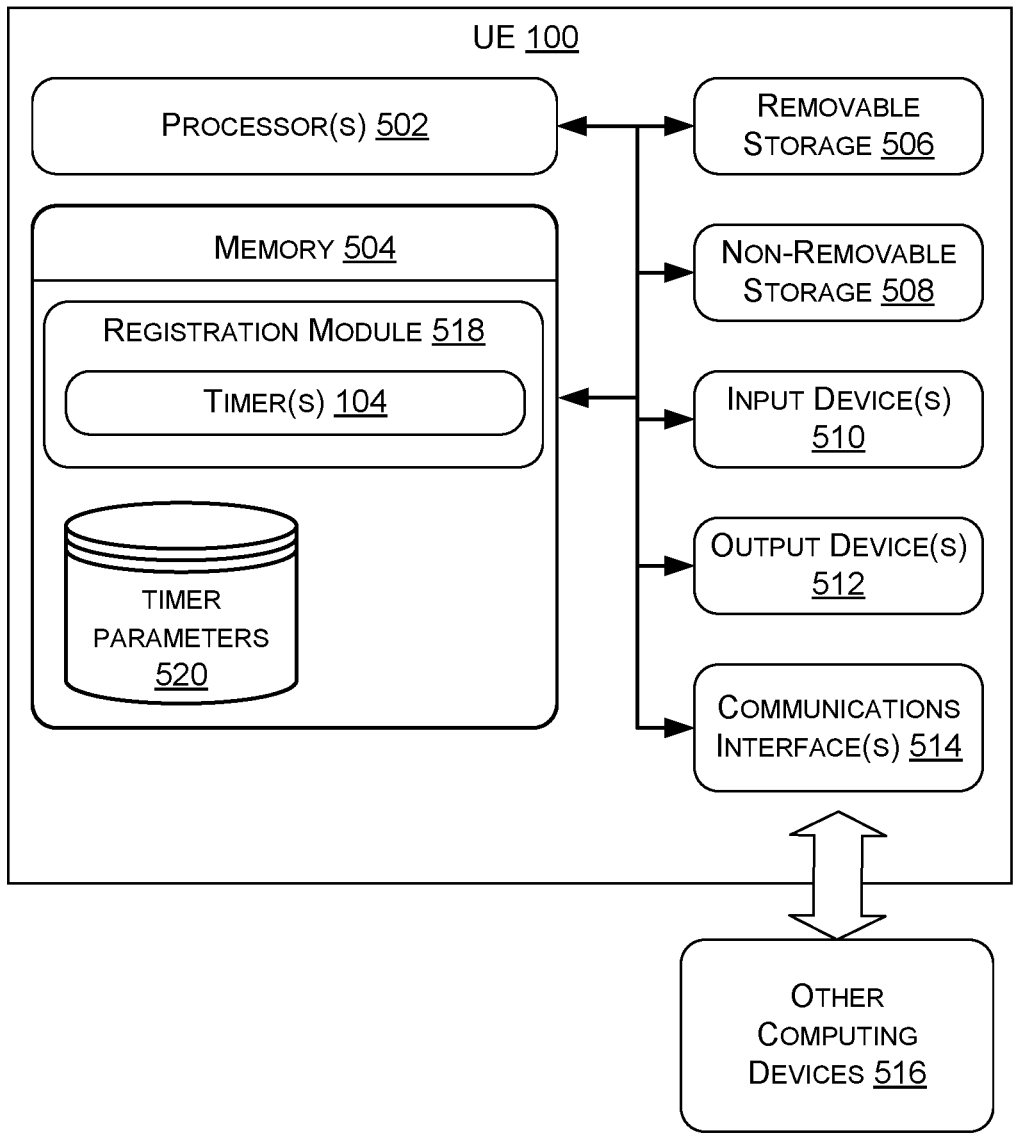
FIG. 5 is a block diagram of an example UE with logic to implement the timer(s), according to various embodiments.

FIG. 5 is a block diagram of an example UE 100 with logic to implement the timer(s) 104, according to various embodiments. As shown, the UE 100 may include one or more processors 502 and one or more forms of computer-readable memory 504. The UE 100 may also include additional storage devices. Such additional storage may include removable storage 506 and/or non-removable storage 508.

The UE 100 may further include input devices 510 (e.g., a touch screen, keypad, keyboard, mouse, pointer, microphone, etc.) and output devices 512 (e.g., a display, printer, speaker, etc.) communicatively coupled to the processor(s) 502 and the computer-readable memory 504. The UE 100 may further include communications interface(s) 514 that allow the UE 100 to communicate with other computing devices 516 (e.g., IMS nodes) such as via a network (e.g., the IMS core, the P-CSCF nodes 102/202, etc.). The communications interface(s) 514 may facilitate transmitting and receiving wired and/or wireless signals over any suitable communications/data technology, standard, or protocol, as described herein. For example, the communications interface(s) 514 can comprise one or more of a cellular radio, a wireless (e.g., IEEE 802.1x-based) interface, a Bluetooth® interface, and so on. In some embodiments, the communications interface(s) 514 may include radio frequency (RF) circuitry that allows the UE 100 to transition between different RATs, such as transitioning between communication with a 5G NR RAT, a 4G LTE RAT and other legacy RATs (e.g., 3G/2G). The communications interface(s) 514 may further enable the UE 100 to communicate over circuit-switch domains and/or packet-switch domains.

In various embodiments, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 may also be described as computer storage media and may include volatile and nonvolatile, removable and non-removable media implemented in any method or technology for storage of information, such as computer readable instructions, data structures, program modules, or other data. Computer-readable memory 504, removable storage 506 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 100. Any such computer-readable storage media may be part of the UE 100.

The memory 504 can include a registration module 518 (i.e., computer-executable instructions (or logic) that, when executed, by the processor(s) 502, perform the various acts and/or processes disclosed herein). For example, the registration module 518 can be configured to carry out the registration procedures described herein. As shown in FIG. 5, the registration module 518 is further configured to implement timer(s) 104, such as the first timer 104(1) (Timer F) and the second timer 104(2) (Timer F1) described herein.

The memory 504 can further be used to store timer parameters 520, such as trigger events, termination events, timer values, and/or fire actions associated with particular timers. Although the timer parameters 520 are illustrated as being stored locally on the UE 100, the UE 100 may be configured to access the timer parameters from a remote storage location, such as a cloud-based service that maintains timer parameters and continually updates those parameters. For locally stored timer parameters, parameter updates may be pushed, periodically, to the UE 100 for storage in the memory 504.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

I claim:
1. A device comprising:
a processor; and
memory storing computer-executable instructions that, when executed by the processor, cause the device to:
send, to a first node of a first network, a first request to register for one or more services of a telecommunication service provider;
start a first timer in response to sending the first request, the first timer being configured to expire after a first period of time and to stop in response to the device receiving a response indicating a successful registration prior to expiration of the first timer;
receive user input to establish a communication session prior to receiving the response indicating the result of the first request to register for the one or more services;
start a second timer in response to receiving the user input, the second timer being configured to expire after a second period of time that is shorter than the first period of time and to stop in response to the device receiving the response indicating the successful registration prior to expiration of the second timer;
determine that the second timer has expired without the device having received the response indicating the successful registration;
cause a premature expiration of the first timer in response to determining that the second timer has expired without the device having received the response indicating the successful registration; and in response to determining that the second timer has expired without the device having received the response indicating the successful registration, send a second request to register for the one or more services to at least one of:
a second node of the first network; or
a node of a second network.

2. The device of claim 1, wherein:
the first network is a fifth Generation (5G) New Radio (NR) network; and
the second network is a fourth Generation (4G) Long Term Evolution (LTE) network.

3. The device of claim 1, wherein:
the first request is a first Session Initiation Protocol (SIP) request using a SIP REGISTER method;
the first node is a first proxy call session control function (P-CSCF) node;
the second request is a second SIP request using the SIP REGISTER method; and
the second node is a second P-CSCF node.

4. The device of claim 3, wherein the computer-executable instructions, when executed by the processor, further cause the device to, prior to sending the first request, receive a list of P-CSCF nodes including the first P-CSCF node and the second P-CSCF node.

5. The device of claim 4, wherein the computer-executable instructions, when executed by the processor, further cause the device to, in response to determining that the second timer has expired, and prior to sending the second request:
determine whether the device has attempted to register for the one or more services with all of the P-CSCF nodes in the list,
wherein the sending of the second request comprises sending the second request to the second P-CSCF node based at least in part on determining that the device has not attempted to register for the one or more services with all of the P-CSCF nodes in the list.

6. The device of claim 4, wherein the sending of the second request comprises sending the second request to the second P-CSCF node, and wherein the computer-executable instructions, when executed by the processor, further cause the device to, after the sending of the second request to the second P-CSCF node:
receive second user input to establish the communication session prior to receiving a response indicating a result of the second request to register for the one or more services;
restart the second timer in response to receiving the second user input;
determine, after restarting the second timer, that the second timer has expired without the device having received the response indicating the successful registration; and
in response to determining that the second timer has expired after the restarting of the second timer:
determine that the device has attempted to register for the one or more services with all of the P-CSCF nodes in the list; and
send a third request to register for the one or more services to the node of the second network.

7. The device of claim 6, wherein:
the first network is a fifth Generation (5G) New Radio (NR) network; and
the second network is a fourth Generation (4G) Long Term Evolution (LTE) network.

8. The device of claim 1, wherein starting the second timer is based at least in part on a state of registration associated with the device being in a pending state at a time at which the user input is received.

9. A method comprising:
sending, by a device, to a first node of a first network, a first request to register for one or more services of a telecommunication service provider;
start a first timer in response to sending the first request, the first timer being configured to expire after a first period of time and to stop in response to the device receiving a response indicating a successful registration prior to expiration of the first timer;
receiving, by the device, user input to establish a communication session prior to receiving the response indicating the result of the first request to register for the one or more services;
starting, by the device, a second timer in response to receiving the user input, the second timer being configured to expire after a second period of time that is shorter than the first period of time and to stop in response to the device receiving the response indicating the successful registration prior to expiration of the second timer;
determining, by the device, that the second timer has expired without the device having received the response indicating the successful registration;
cause a premature expiration of the first timer in response to determining that the second timer has expired without the device having received the response indicating the successful registration; and
in response to determining that the second timer has expired without the device having received the response indicating the successful registration, sending, by the device, a second request to register for the one or more services to at least one of:
a second node of the first network; or
a node of a second network.

10. The method of claim 9, wherein:
the first network is a fifth Generation (5G) New Radio (NR) network; and
the second network is a fourth Generation (4G) Long Term Evolution (LTE) network.

11. The method of claim 9, wherein:
the first request is a first Session Initiation Protocol (SIP) request using a SIP REGISTER method;
the first node is a first proxy call session control function (P-CSCF) node;
the second request is a second SIP request using the SIP REGISTER method; and
the second node is a second P-CSCF node.

12. The method of claim 11, further comprising, prior to the sending of the first request, receiving, by the device, a list of P-CSCF nodes including the first P-CSCF node and the second P-CSCF node.

13. The method of claim 12, further comprising, in response to the determining that the second timer has expired, and prior to the sending of the second request:
determining, by the device, whether the device has attempted to register for the one or more services with all of the P-CSCF nodes in the list,
wherein the sending of the second request comprises sending the second request to the second P-CSCF node based at least in part on determining that the device has not attempted to register for the one or more services with all of the P-CSCF nodes in the list.

14. The method of claim 12, wherein the sending of the second request comprises sending the second request to the second P-CSCF node, and wherein the method further comprises, after the sending of the second request to the second P-CSCF node:
 receiving, by the device, second user input to establish the communication session prior to receiving a response indicating a result of the second request to register for the one or more services;
 restarting, by the device, the second timer in response to the receiving of the second user input;
 determining, by the device, after restarting the second timer, that the timer has expired without the device having received the response indicating the successful registration; and
 in response to the determining that the second timer has expired after the restarting of the second timer:
  determining, by the device, that the device has attempted to register for the one or more services with all of the P-CSCF nodes in the list; and
  sending, by the device, a third request to register for the one or more services to the node of the second network.

15. A non-transitory computer storage medium having a plurality of programming instructions stored thereon that, when executed by one or more processors of a device, cause the device to perform operations comprising:
 sending, to a first node of a first network, a first request to register for one or more services of a telecommunication service provider;
 starting a first timer in response to sending the first request, the first timer being configured to expire after a first period of time and to stop in response to the device receiving a response indicating a successful registration prior to expiration of the first timer;
 receiving user input to establish a communication session prior to receiving the response indicating the result of the first request to register for the one or more services;
 starting a second timer in response to receiving the user input, the second timer being configured to expire after a second period of time that is shorter than the first period of time and to stop in response to the device receiving the response indicating the successful registration prior to expiration of the second timer;
 determining that the second timer has expired without the device having received the response indicating the successful registration;
 causing a premature expiration of the first timer in response to determining that the second timer has expired without the device having received the response indicating the successful registration; and
 in response to determining that the second timer has expired without the device having received the response indicating the successful registration, sending a second request to register for the one or more services to at least one of:
  a second node of the first network; or
  a node of a second network.

16. The non-transitory computer storage medium of claim 15, wherein:
 the first network is a fifth Generation (5G) New Radio (NR) network; and
 the second network is a fourth Generation (4G) Long Term Evolution (LTE) network.

17. The non-transitory computer storage medium of claim 15, wherein:
 the first request is a first Session Initiation Protocol (SIP) request using a SIP REGISTER method;
 the first node is a first proxy call session control function (P-CSCF) node;
 the second request is a second SIP request using the SIP REGISTER method; and
 the second node is a second P-CSCF node.

18. The non-transitory computer storage medium of claim 17, wherein the operations further comprise, prior to sending the first request, receiving a list of P-CSCF nodes including the first P-CSCF node and the second P-CSCF node.

19. The non-transitory computer storage medium of claim 18, wherein the operations further comprise, in response to determining that the second timer has expired, and prior to sending the second request:
 determining whether the device has attempted to register for the one or more services with all of the P-CSCF nodes in the list,
 wherein the sending of the second request comprises sending the second request to the second P-CSCF node based at least in part on determining that the device has not attempted to register for the one or more services with all of the P-CSCF nodes in the list.

20. The non-transitory computer storage medium of claim 18, wherein the sending of the second request comprises sending the second request to the second P-CSCF node, and wherein the operation further comprise, after the sending of the second request to the second P-CSCF node:
 receiving second user input to establish the communication session prior to receiving a response indicating a result of the second request to register for the one or more services;
 restarting the second timer in response to receiving the second user input;
 determining, after restarting the second timer, that the second timer has expired without the device having received the response indicating the successful registration; and
 in response to determining that the second timer has expired after the restarting of the second timer:
  determining that the device has attempted to register for the one or more services with all of the P-CSCF nodes in the list; and
  sending a third request to register for the one or more services to the node of the second network.

* * * * *